United States Patent Office 3,388,019
Patented June 11, 1968

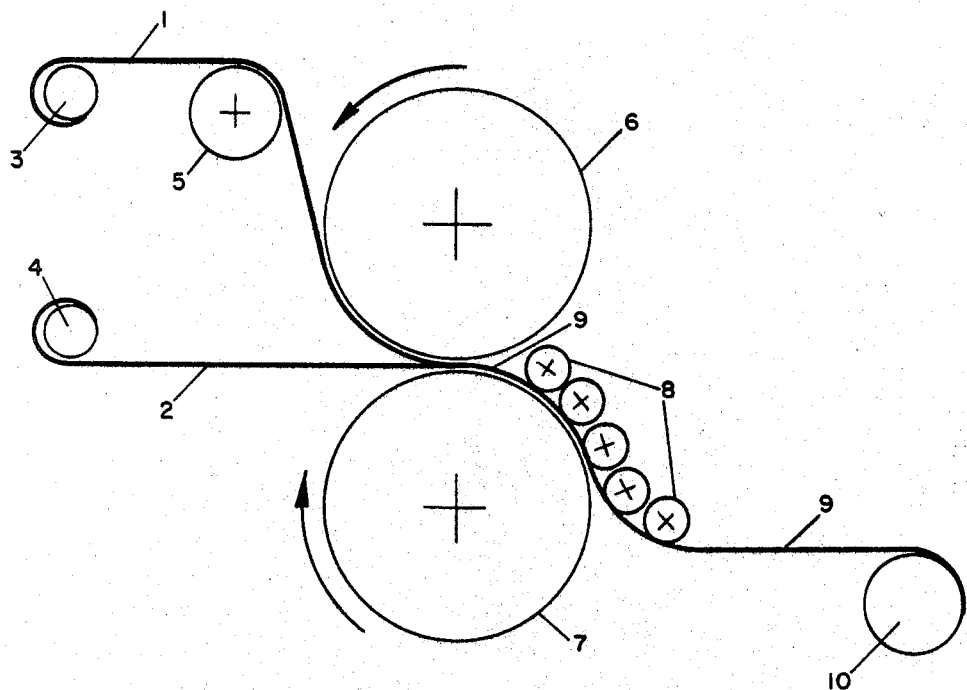

3,388,019
LAMINATION OF ORIENTED FILM TO PAPER
Jonathan I. Thigpen, Wilmington, Del., assignor to Hercules Incorporated, a corporation of Delaware
Filed Aug. 19, 1964, Ser. No. 390,578
5 Claims. (Cl. 156—282)

ABSTRACT OF THE DISCLOSURE

Laminates of uni- or bi-axially oriented thermoplastic film with paper are prepared without the assistance of an intermediate adhesive layer by heating the paper to a temperature above the melting point of the film and immediately passing paper and film into the nip of a pair of nip rolls. The nip roll which contacts the film is cooled to prevent melting or otherwise disturbing the orientation of the film, while the side of the film which contacts the paper has a very thin section softened whereby the adhesion to the paper is effected.

This invention relates to a process for bonding oriented thermoplastic synthetic film to non-thermoplastic fibrous webs without the use of an intermediate adhesive layer and to the unique products so formed. In a specific embodiment, it relates to bonding oriented thermoplastic film to paper.

Laminates of paper with synthetic organic polymer films are known to the art. Such laminates are useful and desirable in that, depending upon the particular polymer employed, they effect very desirable improvements over the properties of either the paper or the film alone. For instance, the thermoplastic material is helpful in increasing the water and gas permeability of the paper, increasing its resistance to chemicals, increasing its heat sealability, and increasing its tear resistance. The thermoplastic film layer also serves to protect any printing or advertising indicia on the paper surface.

However, the thermoplastic layer applied to the paper in most of the prior art laminates has been an unoriented film. Few problems are associated with the bonding of an unoriented film to paper. One method has been disclosed which comprises passing the paper into the nip formed by a pair of coacting pull rolls and simultaneously extruding a molten film of the polymer into the nip in contact with the paper. The film and paper are pressed firmly together as they pass through the nip and remain bonded after cooling below the solidification point of the film. The use of an intermediate adhesive layer is optional with this process, it being possible to bond the polymer to paper without using any adhesive, if desired.

In another procedure known to the prior art, a self-supporting, unoriented film of the polymer is brought into contact with the paper at a temperature sufficient to soften the polymer. By applying pressure, as by a set of nip rolls, to the softened film, it is caused to adhere firmly to the paper. Again, the use of an adhesive layer is optional. Normally, however, no adhesive is employed, since satisfactory bonding can be obtained without it.

It has long been known that the improved properties which are imparted to paper as a result of laminating it with an unoriented film of synthetic polymer can be improved even more if a uniaxially or biaxially oriented film is used. That is to say that oriented films exhibit less moisture and gas permeability, and greater strength than do their unoriented counterparts, and these properties imbue to the laminate. However, a good technique has not been developed to date for creating a bond between oriented film and paper without destroying the orientation of the film.

Belgian Patent 593,956 discloses the formation of laminates similar to those of this invention comprising paper and a biaxially oriented thermoplastic film. However, these laminates employ an intermediate layer of unoriented, lower melting polymer as an adhesive. The film and the paper are passed into the nip between a pair of pull rolls, and the molten polymer is extruded into the nip at the point where the paper and the film touch. The lower melting polymer thus forms a layer fused to film on one side and to paper on the other. The use of the intermediate layer, however, introduces both economic and practical problems. In particular, the necessity of applying the intermediate layer of lower melting material constitutes an additional process step which increases the cost of the finished product. Costs are particularly a problem in this area since the major outlet for these laminates is as packaging materials and these must necessarily be cheap.

The necessity of using a lower melting material as the intermediate layer also limits the applicability of the method. In addition to being lower melting than the oriented thermoplastic material, the intermediate layer must be one which readily forms strong bonds with both paper and the thermoplastic surface layer. Since there are many types of synthetic polymers which are not capable of bonding one with another, it is readily seen that problems can be encountered in selecting an intermediate layer for a particular type of oriented film layer. Yet another disadvantage of such laminates is that the intermediate layer adds significantly to their thickness.

In the past, efforts to laminate paper with an oriented film without an intermediate adhesive layer have resulted in failure due to the tendency of the oriented film to shrink and thus lose all or part of its orientation when heated to a temperature sufficient to effect the bonding of the film to paper.

It has now been found that an oriented thermoplastic film can be bonded to paper without the use of an intermediate adhesive layer and without losing orientation by a process which comprises heating the paper to a temperature above the melting point of the polymer comprising the film, contacting the heated paper with one side of the film under pressure, while simultaneously cooling the opposite side of the film to form a laminate, and restraining the film from shrinking until the temperature at the interface of the paper and film has dropped below the melting point of the polymer. When this sequence of steps is followed, only that surface of the film which contacts the paper becomes heated above the melting point of the polymer, and since the film is restrained from shrinking until this surface has cooled, there occurs substantially no adverse effect upon the orientation of the film.

The method is applicable to the lamination of paper with virtually any type of oriented thermoplastic film. Examples of such films are poly(vinylidene chloride), poly(ethylene terephthalate), high density polyethylene, stereoregular polypropylene, polystyrene, and the like. Such laminates find many uses as packing materials and protective coverings in general.

The attached drawing illustrates a preferred method of performing the process of the invention. In the drawing, numeral 3 represents a paper supply, 4 is a film supply, 5 a paper guide roll, 6 and 7 a pair of pull rolls, 8 a series of restraining rolls, and 10 a laminate rewind.

In a preferred embodiment of the process, continuous webs of paper 1 and oriented film 2 are fed from supply rolls 3 and 4, respectively, to the nip between pull rolls 6 and 7. The paper is fed around guide roll 5 whereby it is brought into contact with pull roll 6 about one quarter of one revolution prior to the nip where it contacts the film. Pull roll 6 is heated to a temperature sufficient to raise the temperature of the paper in contact therewith to a point higher than the melting point of the oriented film. Heating can be accomplished by any method capable of effecting the necessary temperature increase, preferably by means of a heat transfer fluid circulated through the roll. The oriented film is fed directly into the nip where one of its surfaces contacts the heated paper and the other surface contacts pull roll 7. The distance or gap between rolls 6 and 7 is such as to exert positive pressure on the paper-film assembly in the nip of the rolls. Pull roll 7 is unheated and if desired, can be cooled below room temperature by any convenient means. A very thin layer of the surface of the film which contacts the heated paper becomes melted upon contact therewith so that it adheres to the paper. Because of the cooling effect of pull roll 7, the remainder of the film remains solid and its orientation is not disturbed. Further to assure that the orientation of the film is not disturbed, film restraining rolls 8 maintain the film surface of the newly formed laminate 9 in contact with cool pull roll 7 and restrain the edges from shrinking until the paper surface has completely cooled below the melting point of the film. The laminate then passes to laminate rewind 10 where it is wound into rolls preparatory to further operations.

Typical operation of the process is shown in the following illustrative examples.

Example 1

Biaxially oriented stereoregular polypropylene film of 60 gage thickness and 3 mil white bond paper were fed into the nip of a pair of counter-rotating pull rolls. The paper first made contact with its pull roll at a point one quarter of one revolution away from the point of cotangency of the two rolls. This roll was heated to about 190° C. by means of a diphenyl-diphenyloxide heat transfer fluid.

The biaxially oriented polypropylene film was fed directly into the nip between the rolls, one surface of the film contacting the roll not contacted by the paper, this latter roll being maintained at about room temperature. The other surface of the film contacted the hot paper traveling on the other roll whereby it was softened and formed a laminate with the paper.

Immediately upon leaving the nip of the pull rolls, the laminate was contacted by a series of restraining rolls which were positioned to function as squeeze rolls to maintain the newly formed laminate in contact with the cooled pull roll for about one quarter of one revolution of the pull roll. The cooled laminate was then wound into rolls.

The laminate thus formed exhibited excellent adhesion between the paper and the film with no measurable loss in film orientation.

Example 2

A film of 0.5 mil biaxially oriented polyethylene terephthalate film was laminated with kraft paper of 3 mil thickness using the procedure of Example 1, except that the hot pull roll was maintained at about 300° C. The resulting laminate exhibited good adhesion between plies and no measurable loss in film orientation.

The examples and preceding discussion have dealt with a preferred embodiment of the invention. However, modifications of the process are possible. For example, a cloth or fabric substrate or even a thin metal foil can be substituted for the paper substrate.

What I claim and desire to protect by Letters Patent is:

1. A method of bonding a self-supporting oriented synthetic organic thermoplastic polymer film to a non-thermoplastic fibrous web which comprises heating the web to a temperature above the melting point of the polymer comprising the film, contacting the heated web with one side of the film under pressure while simultaneously cooling the opposite side of the film to thereby fuse the surface region of said one side while maintaining a major thickness of said film below its melting point to thereby form a laminate, and restraining the film from shrinking until the temperature at the interface of the web and film has cooled to below the melting point of the polymer, whereby the orientation of said film is substantially preserved.

2. A method of bonding a self-supporting oriented synthetic organic thermoplastic film to paper which comprises simultaneously passing the paper and the film under pressure through the nip of a pair of pull rolls to form a laminate, said pair of pull rolls having a cool member in contact with the film and a heated member in contact with the paper whereby the temperature of the paper at the point of contact with the film is raised to a point above the melting point of the polymer comprising the film and the film is simultaneously cooled on its surface away from the paper, to thereby fuse the surface region of said one side while maintaining a major thickness of said film below its melting point, and restraining the film from shrinking until the temperature at the interface of the paper and film has cooled to below the melting point of the polymer, whereby the orientation of said film is substantially preserved.

3. The process of claim 2 where the pull roll which contacts the paper is heated to a temperature sufficient to raise the temperature of the paper to a point above the melting point of the polymer of which the oriented film is comprised.

4. The process of claim 3 where the paper is in contact with the heated roll for at least one quarter of one revolution prior to contacting the oriented film.

5. The process of claim 4 where the film is biaxially oriented stereoregular polypropylene.

References Cited

UNITED STATES PATENTS

| 3,081,571 | 3/1963 | Dayen et al. | 156—306 X |
| 3,249,482 | 5/1966 | Gilfillan | 156—322 |
| 3,146,284 | 10/1964 | Markwood | 264—210 |

FOREIGN PATENTS

| 726,949 | 3/1955 | Great Britain. |
| 759,876 | 10/1956 | Great Britain. |

EARL M. BERGERT, *Primary Examiner.*

W. E. HOAG, *Assistant Examiner.*